United States Patent
Fitzpatrick et al.

(10) Patent No.: US 10,094,244 B2
(45) Date of Patent: Oct. 9, 2018

(54) CERAMIC MATRIX COMPOSITE RING SHROUD RETENTION METHODS-WIGGLE STRIP SPRING SEAL

(71) Applicant: General Electric Company, Schenectady, NY (US)

(72) Inventors: Dylan James Fitzpatrick, Peabody, MA (US); Christopher Paul Tura, Nahant, MA (US)

(73) Assignee: General Electric Company, schenectady, NY (US)

( * ) Notice: Subject to any disclaimer, the term of this patent is extended or adjusted under 35 U.S.C. 154(b) by 374 days.

(21) Appl. No.: 14/858,542

(22) Filed: Sep. 18, 2015

(65) Prior Publication Data

US 2017/0081979 A1     Mar. 23, 2017

(51) Int. Cl.
  *F01D 25/24* (2006.01)
  *F02C 7/20* (2006.01)
  (Continued)

(52) U.S. Cl.
  CPC ............. *F01D 25/246* (2013.01); *F01D 9/02* (2013.01); *F01D 11/003* (2013.01); *F02C 3/04* (2013.01);
  (Continued)

(58) Field of Classification Search
  CPC .. F02C 7/20; F02C 7/28; F01D 11/003; F01D 11/005; F01D 25/246; F01D 25/243;
  (Continued)

(56) References Cited

U.S. PATENT DOCUMENTS 4,295,785 A   10/1981 Lardellier
4,953,282 A    9/1990 Corsmeier et al.
(Continued)

FOREIGN PATENT DOCUMENTS

CN  101372902 A   2/2009
CN  101550844 A  10/2009
(Continued)

OTHER PUBLICATIONS

A European Search Report and Opinion issued in connection with corresponding EP Application No. 16189266.6 dated Jan. 30, 2017.
(Continued)

*Primary Examiner* — Andrew Nguyen
(74) *Attorney, Agent, or Firm* — General Electric Company; William Andes

(57) ABSTRACT

The present disclosure is directed to a retention assembly for a stationary gas turbine component. The retention assembly includes a first stationary gas turbine wall having a first surface. A retention boss extends outwardly from the first surface. The retention assembly includes a second stationary gas turbine wall having a second surface. A retainer is positioned between the first and the second surfaces. The retainer includes a base wall positioned adjacent to the retention boss. A first sidewall extends outwardly from the base wall, and a second sidewall extends outwardly from the base wall. A first arm extends outwardly from the first sidewall, and a second arm extends outwardly from the second sidewall. Each of the first arm and the second arm includes a plurality of convolutions. At least one of the plurality of convolutions is in contact with the second surface.

17 Claims, 4 Drawing Sheets

(51) Int. Cl.
*F01D 11/00* (2006.01)
*F01D 9/02* (2006.01)
*F02C 3/04* (2006.01)

(52) U.S. Cl.
CPC ............ *F02C 7/20* (2013.01); *F05D 2220/32* (2013.01); *F05D 2250/711* (2013.01); *F05D 2250/712* (2013.01); *F05D 2260/30* (2013.01); *F05D 2300/6033* (2013.01); *Y02T 50/672* (2013.01)

(58) Field of Classification Search
CPC ............ F05D 2240/14; F05D 2240/11; F05D 2240/91; F05D 2260/30; F23R 3/60
See application file for complete search history.

(56) References Cited

U.S. PATENT DOCUMENTS

| | | | |
|---|---|---|---|
| 5,188,507 | A | 2/1993 | Sweeney |
| 5,593,276 | A | 1/1997 | Proctor et al. |
| 6,726,448 | B2 | 4/2004 | McGrath et al. |
| 6,733,235 | B2 | 5/2004 | Alford et al. |
| 7,434,670 | B2 | 10/2008 | Good et al. |
| 8,985,944 | B2 | 3/2015 | Shapiro et al. |
| 2003/0202876 | A1 | 10/2003 | Jasklowski et al. |
| 2004/0154303 | A1* | 8/2004 | Mitchell ............... F01D 11/005 60/772 |
| 2005/0073114 | A1* | 4/2005 | Amos ................... F01D 11/005 277/644 |
| 2010/0104426 | A1 | 4/2010 | Keller et al. |
| 2011/0236203 | A1* | 9/2011 | Arilla ...................... F01D 9/04 415/213.1 |
| 2012/0171027 | A1* | 7/2012 | Albers .................. F01D 11/005 415/208.1 |
| 2016/0161121 | A1 | 6/2016 | Chang |
| 2016/0177786 | A1 | 6/2016 | Sippel et al. |
| 2017/0044921 | A1 | 2/2017 | Vetters et al. |
| 2017/0081968 | A1 | 3/2017 | Fitzpatrick et al. |
| 2017/0081978 | A1 | 3/2017 | Fitzpatrick et al. |

FOREIGN PATENT DOCUMENTS

| | | |
|---|---|---|
| EP | 0017534 A1 | 10/1980 |
| GB | 2486964 A | 7/2012 |
| JP | S57-59002 A | 4/1982 |
| JP | 2000-320306 A | 11/2000 |
| JP | 2004-332736 A | 11/2004 |
| WO | 2010058137 A1 | 5/2010 |
| WO | 2013181231 A1 | 12/2013 |

OTHER PUBLICATIONS

A European Search Report and Opinion issued in connection with corresponding EP Application No. 16189270.8 dated Feb. 3, 2017.
GE Related Case Form.
U.S. Non-Final Office Action issued in connection with related U.S. Appl. No. 14/858,508 dated Mar. 28, 2017.
Notification of Reasons for Refusal issued in connection with related JP Application No. 2016-173234 dated Jul. 34, 2017.
First Office Action and Search issued in connection with related CN Application No. 201610823401.6 dated Aug. 30, 2017.
First Office Action and Search issued in connection with corresponding CN Application No. 201610822742.1 dated Aug. 30, 2017.
European Search Report and Opinion issued in connection with related EP Application No. 16189260.9 dated Feb. 21, 2017.

* cited by examiner

CERAMIC MATRIX COMPOSITE RING SHROUD RETENTION METHODS-WIGGLE STRIP SPRING SEAL

FIELD OF THE INVENTION

The present subject matter relates generally to a retention assembly for a gas turbine engine. More particularly, the present subject matter relates to a retention assembly for a stationary component in a gas turbine engine, such as a turbine shroud.

BACKGROUND OF THE INVENTION

A gas turbine engine generally includes, in serial flow order, a compressor section, a combustion section, a turbine section, and an exhaust section. In operation, air enters an inlet of the compressor section where one or more axial compressors progressively compress the air until it reaches the combustion section. Fuel mixes with the compressed air and burns within the combustion section, thereby creating combustion gases. The combustion gases flow from the combustion section through a hot gas path defined within the turbine section and then exit the turbine section via the exhaust section.

In particular configurations, the turbine section includes, in serial flow order, a high pressure (HP) turbine and a low pressure (LP) turbine. The HP and the LP turbines each include one or more turbine blades that extract kinetic energy and/or thermal energy from the combustion gases flowing therethrough. Each turbine blade typically includes a turbine shroud, which forms a ring or enclosure around the turbine blade. That is, each turbine shroud is positioned radially outward from and circumferentially encloses each corresponding turbine blade. In this respect, each turbine blade and each corresponding turbine shroud form a gap therebetween.

The components defining the hot gas path, such as the turbine shrouds, may be constructed a ceramic matrix composite material or another material capable of withstanding prolonged exposure to the hot combustion gases. The components positioned radially outward from the hot gas path, such as the turbine shroud mounts, typically experience lower temperatures than the components along the hot gas path. In this respect, these components may be constructed from suitable metallic materials.

Conventional retention systems typically used in gas turbine engines to radially and/or circumferentially couple components in gas turbine engines constructed from disparate materials (e.g., a ceramic matrix composite turbine shroud and a metallic turbine shroud mount) include numerous components. For example, such systems may include complex arrangements of pins and/or springs. This results in increased assembly time and cost when constructing the gas turbine. Accordingly, a retention assembly for radially and/or circumferentially coupling stationary components of a gas turbine engine having a reduced part count would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a retention assembly for a stationary gas turbine component. The retention assembly includes a first stationary gas turbine wall having a first surface. A retention boss extends outwardly from the first surface. The retention assembly includes a second stationary gas turbine wall having a second surface. A retainer is positioned between the first surface and the second surface. The retainer includes a base wall positioned adjacent to the retention boss of the first stationary gas turbine wall. A first sidewall extends outwardly from the base wall, and a second sidewall extends outwardly from the base wall. A first arm extends outwardly from the first sidewall, and a second arm extends outwardly from the second sidewall. Each of the first arm and the second arm includes a plurality of convolutions. At least one of the plurality of convolutions is in contact with the second surface.

In a further aspect, the present disclosure is directed to a gas turbine. The gas turbine includes a compressor, a combustion section, and a turbine section. The turbine section includes a first stationary wall having a first surface. A retention boss extends outwardly from the first surface. A second stationary wall includes a second surface. A retainer is positioned between the first surface and the second surface. The retainer includes a base wall. A first sidewall extends outwardly from the base wall, and a second sidewall extends outwardly from the base wall. A first arm extends outwardly from the first sidewall, and a second arm extends outwardly from the second sidewall. Each of the first arm and the second arm includes a plurality of convolutions, and at least one of the plurality of convolutions is in contact with the second surface.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
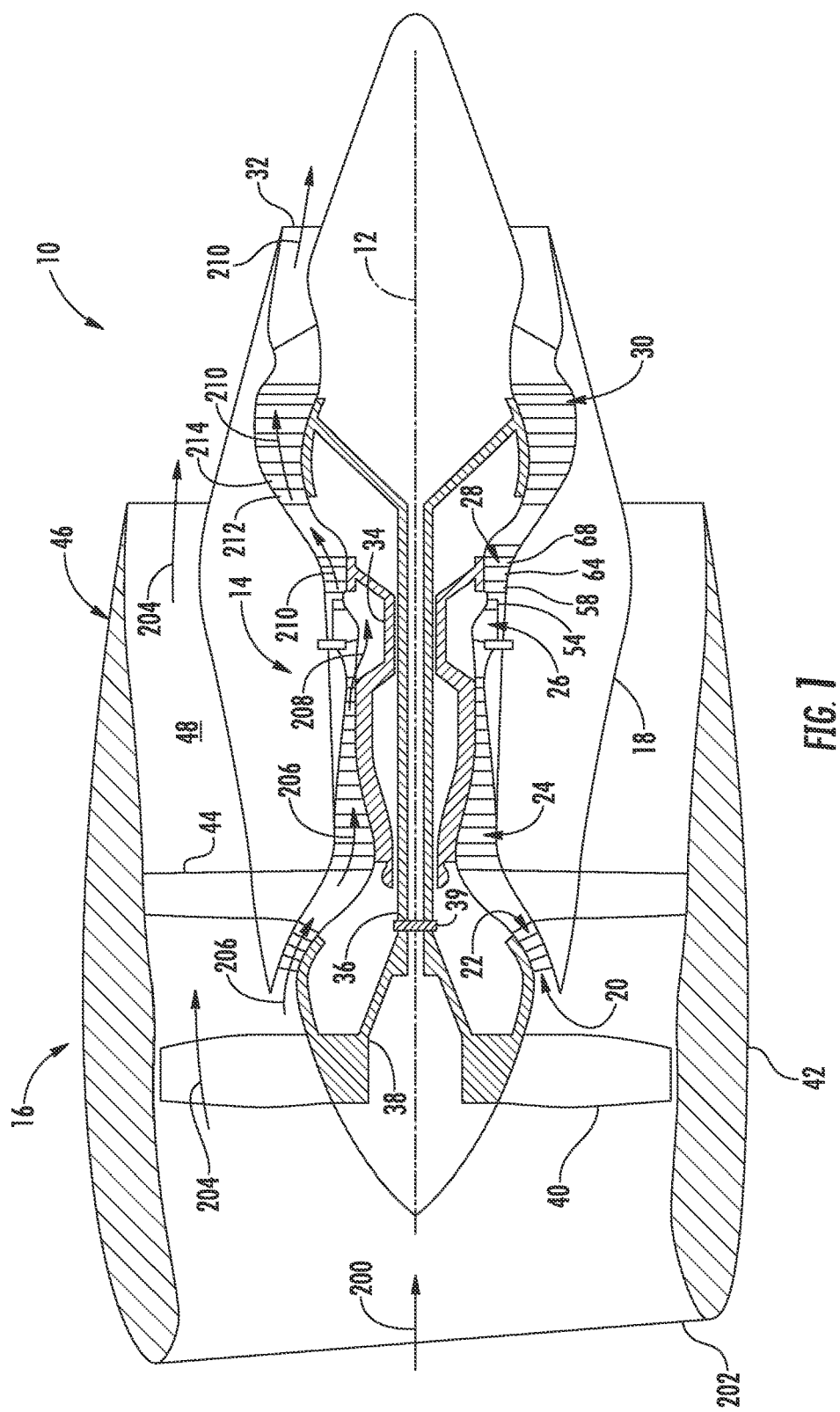
FIG. 1 is a schematic cross-sectional view of an exemplary high bypass turbofan jet engine in accordance with the embodiments disclosed herein.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents. Although exemplary embodiments of the present invention will be described generally in the context of a turbine shroud incorporated into a turbofan jet engine for purposes of illustration, one of ordinary skill in the art will readily appreciate that embodiments of the present invention may be applied to any turbine incorporated into any turbomachine and are not limited to a gas turbofan jet engine unless specifically recited in the claims.

Referring now to the drawings, wherein identical numerals indicate the same elements throughout the figures, FIG. 1 is a schematic cross-sectional view of an exemplary high bypass turbofan type gas turbine engine 10 herein referred to as "turbofan 10" and may incorporate various embodiments of the present invention. As shown in FIG. 1, the turbofan 10 has a longitudinal or axial centerline axis 12 extending therethrough for reference purposes. In general, the turbofan 10 may include a core turbine or gas turbine engine 14 disposed downstream from a fan section 16.

The gas turbine engine 14 may generally include a substantially tubular outer casing 18 that defines an annular inlet 20. The outer casing 18 may be formed from multiple casings. The outer casing 18 encases, in serial flow relationship, a compressor section having a booster or low pressure (LP) compressor 22 and a high pressure (HP) compressor 24, a combustion section 26, a turbine section having a high pressure (HP) turbine 28 and a low pressure (LP) turbine 30, and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The LP spool 36 may also connect to a fan spool or shaft 38 of the fan section 16. In particular embodiments, as shown in FIG. 1, the LP spool 36 may connect directly to the fan spool 38, such as in a direct-drive configuration. In alternative configurations, the LP spool 36 may connect to the fan spool 38 via a reduction gear 39, such as in an indirect-drive or geared-drive configuration.

As shown in FIG. 1, the fan section 16 includes a plurality of fan blades 40 coupled to and extending radially outwardly from the fan spool 38. An annular fan casing or nacelle 42 circumferentially surrounds the fan section 16 and/or at least a portion of the gas turbine engine 14. It should be appreciated by those of ordinary skill in the art that the nacelle 42 may be configured to be supported relative to the gas turbine engine 14 by a plurality of circumferentially-spaced outlet guide vanes 44. Moreover, a downstream section 46 of the nacelle 42 may extend over an outer portion of the gas turbine engine 14 to define a bypass airflow passage 48 therebetween.

Figure 2:
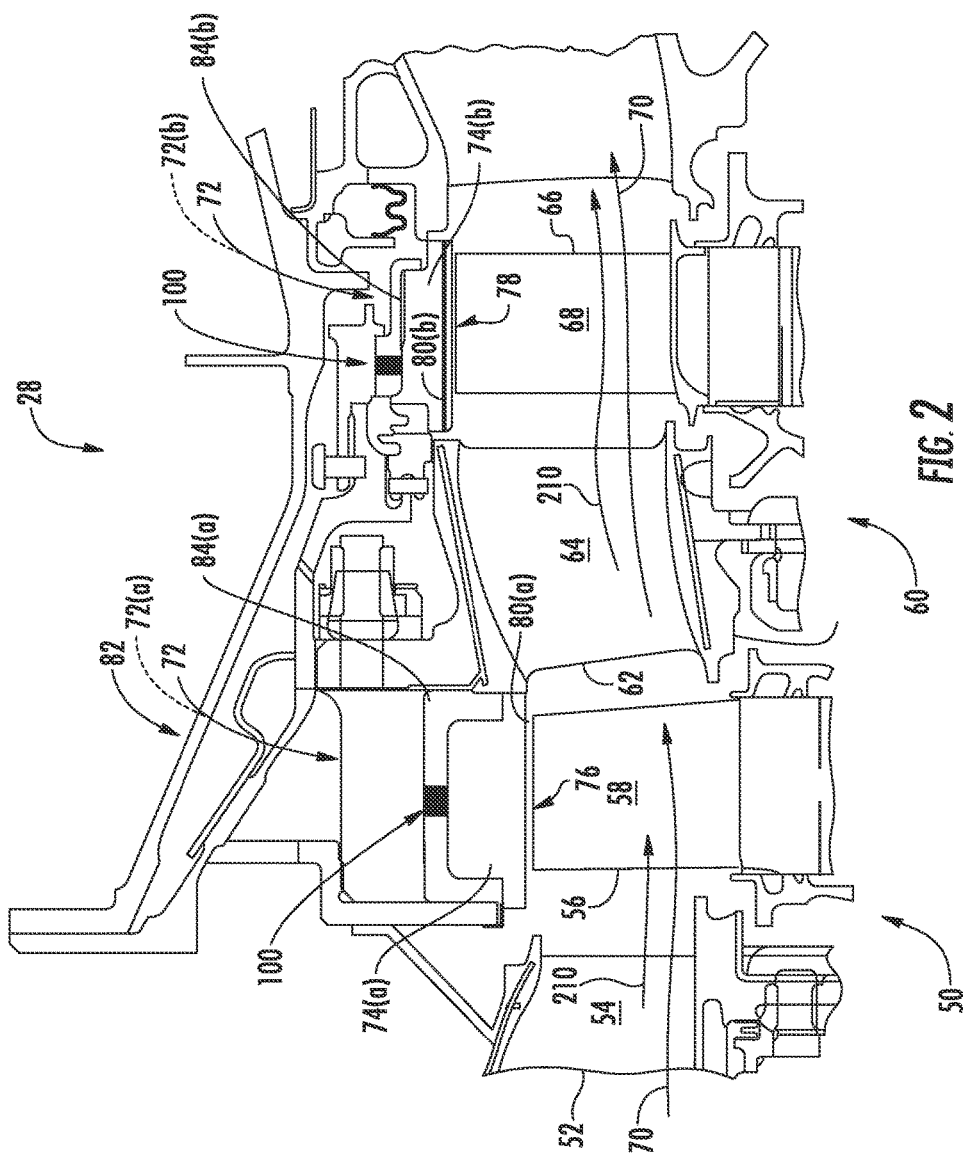
FIG. 2 is an enlarged cross sectional side view of a high pressure turbine portion of the gas turbine engine shown in FIG. 1, illustrating the location of a retention assembly in a high pressure (HP) turbine.

FIG. 2 is an enlarged cross-sectional view of the HP turbine 28 portion of the gas turbine engine 14 as shown in FIG. 1, which may incorporate various embodiments disclosed herein. As shown in FIG. 2, the HP turbine 28 includes, in serial flow relationship, a first stage 50 having a row 52 of one or more stator vanes 54 (only one shown) axially spaced apart from a row 56 of one or more turbine rotor blades 58 (only one shown). The HP turbine 28 further includes a second stage 60 having a row 62 of one or more stator vanes 64 (only one shown) axially spaced apart from a row 66 of one or more turbine rotor blades 68 (only one shown).

The turbine rotor blades 58, 68 extend radially outwardly from and are coupled to the HP spool 34 (FIG. 1). As shown in FIG. 2, the stator vanes 54, 64 and the turbine rotor blades 58, 68 at least partially define a hot gas path 70 for routing combustion gases from the combustion section 26 (FIG. 1) through the HP turbine 28. As shown in FIG. 1, the rows 52, 62 of the stator vanes 54, 64 are annularly arranged about the HP spool 34 and the rows 56, 66 of the turbine rotor blades 58, 68 are circumferentially spaced around the HP spool 34.

As shown in FIG. 2, various embodiments of the HP turbine 28 include at least one turbine shroud assembly 72. For example, the HP turbine 28 may include a first turbine shroud assembly 72(a) and a second turbine shroud assembly 72(b). Each turbine shroud assembly 72(a), 72(b) generally forms a ring or shroud around the corresponding row 56, 66 of turbine rotor blades 58, 68.

Each turbine shroud assembly 72(a), 72(b) may include a turbine shroud or shroud seal 74(a), 74(b) radially spaced from blade tips 76, 78 of the turbine rotor blades 58, 68. A retention assembly 100 connects each turbine shroud 74(a), 74(b) to a corresponding turbine shroud mount 84(a), 84(b). In particular, and as will be discussed in greater detail below, the retention assembly 100 circumferentially and radially retains each turbine shroud 74(a), 74(b) relative to each turbine shroud assembly 72(a), 72(b). The turbine shroud mount 84(a), 84(b) may connect to a casing 82 of the turbofan 10.

This arrangement forms clearance gaps between the blade tips 76, 78 and sealing surfaces or hot side surfaces 80(a), 80(b). As mentioned above, it is generally desirable to minimize the clearance gap between the blade tips 76, 78 and the turbine shrouds 74(a), 74(b), particularly during cruise operation of the turbofan 10, to reduce leakage from the hot gas path 70 over the blade tips 76, 78 and through the clearance gaps. In particular embodiments, at least one of the turbine shrouds 74(a), 74(b) may be formed as a continuous, unitary, or seamless ring.

As illustrated in FIG. 1, air 200 enters an inlet portion 202 of the turbofan 10 during operation thereof. A first portion of the air 200 indicated by arrow 204 flows into the bypass flow passage 48, and a second portion of the air 200 indicated by arrow 206 enters the inlet 20 of the LP compressor 22. The LP compressor 22 progressively compresses the second portion of air 206 flowing therethrough en route to the HP compressor 24. The HP compressor 24 further compresses the second portion of the air 206 flowing therethrough 24, thus providing compressed air indicated by arrow 208 to the combustion section 26 where it mixes with fuel and burns to provide combustion gases indicated by arrow 210.

The combustion gases 210 flow through the HP turbine 28 where the stator vanes 54, 64 and turbine rotor blades 58, 68 extract a first portion of kinetic and/or thermal energy from the combustion gases 210. This energy extraction supports operation of the HP compressor 24. The combustion gases 210 then flow through the LP turbine 30 where sequential stages of LP turbine stator vanes 212 and LP turbine rotor blades 214 coupled to the LP shaft or spool 36 extract a second portion of thermal and/or kinetic energy from the combustion gases 210. This energy extraction causes the LP shaft or spool 36 to rotate, thereby supporting operation of the LP compressor 22 and/or rotation of the fan spool or shaft 38. The combustion gases 210 then flow through the jet exhaust nozzle section 32 of the gas turbine engine 14.

Along with a turbofan 10, a core turbine 14 serves a similar purpose and sees a similar environment in land-based gas turbines, turbojet engines in which the ratio of the first portion of air 204 to the second portion of air 206 is less than that of a turbofan, and unducted fan engines in which the fan section 16 is devoid of the nacelle 42. In each of the turbofan, turbojet, and unducted engines, a speed reduction device (e.g., the reduction gearbox 39) may be included between any shafts and spools. For example, the reduction gearbox 39 may be disposed between the LP spool 36 and the fan shaft 38 of the fan section 16.

Figure 3:
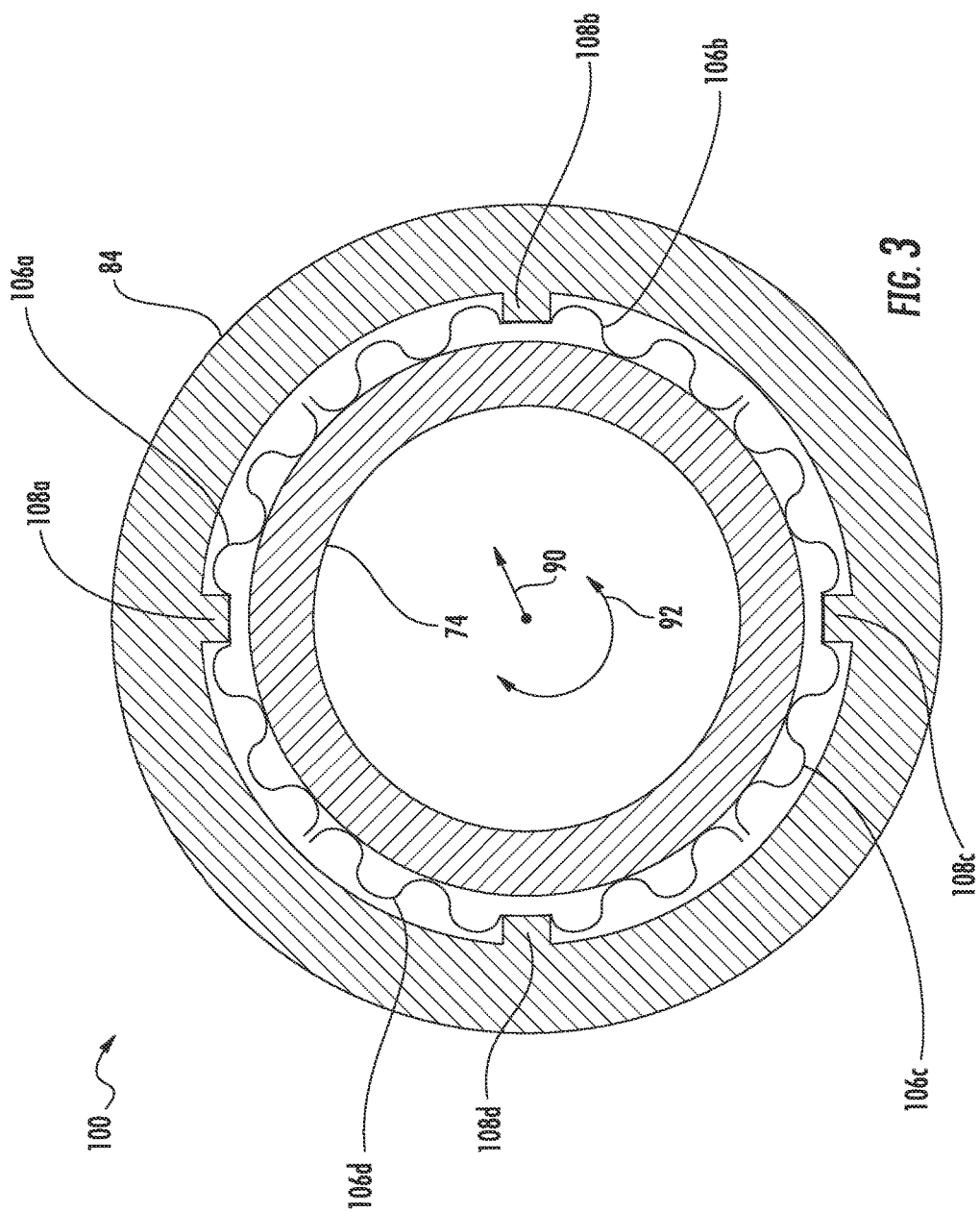
FIG. 3 is a cross sectional front view of the retention assembly, illustrating a plurality of retainers positioned radially between a turbine shroud and a turbine shroud mount.
Figure 4:
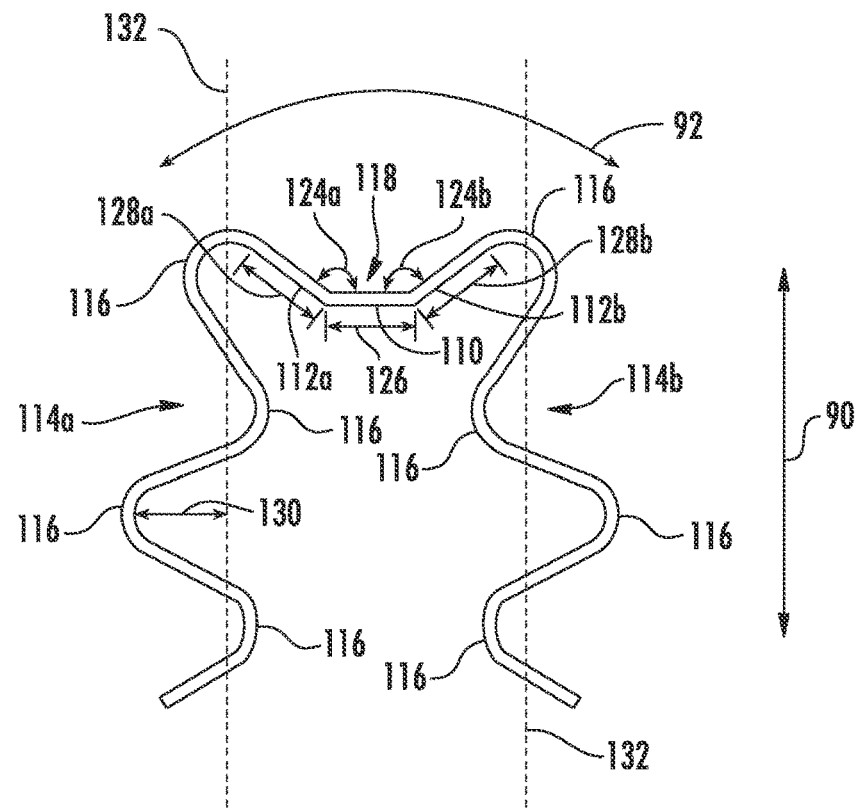
FIG. 4 is a front view of the retainer before installation into the turbofan jet engine, illustrating the features thereof.
Figure 5:
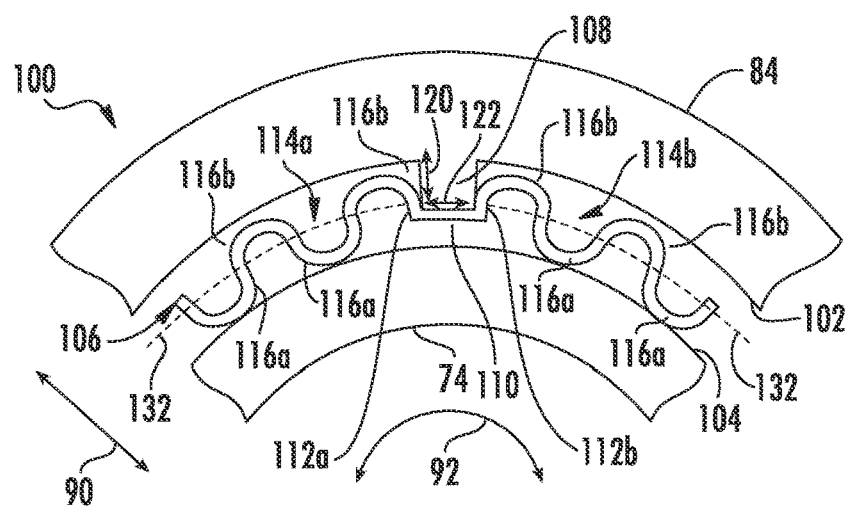
FIG. 5 is an enlarged front cross-sectional view of the retention assembly, illustrating the features of the retainer after installation into the turbofan jet engine.

FIGS. 3-5 illustrate the various components and features of the retention assembly 100. More specifically, FIG. 3 illustrates a plurality of retainers positioned radially between a turbine shroud 74 and a turbine shroud mount 84. FIG. 4 shows the retainer in an unassembled state. FIG. 5 portrays the various features of the retention assembly 100 after the retainer is installed into the turbofan 10.

As illustrated in FIGS. 3-5, the retention assembly 100 defines a radial direction identified by an arrow 90 and a circumferential direction identified by an arrow 92. In general, the radial direction extends orthogonally outward from the longitudinal axis 12 and the circumferential direction extends concentrically around the longitudinal axis 12. The retention assembly 100 further defines an axial direction, which extends into the page of FIGS. 3-5 (i.e., parallel to the longitudinal axis).

The retention assembly 100 secures a second gas turbine wall, such as a turbine shroud 74, to a first gas turbine wall, such as a turbine shroud mount 84. The turbine shroud mount 84 and the turbine shroud 74 may respectively be any of the turbine shroud mounts 84(a), 84(b), etc. or the turbine shrouds 74(a), 74(b), etc. in the turbofan 10. Although, the first and second gas turbine walls may be any other adjacent stationary components in the turbofan 10. The turbine shroud mount 84 includes a radially inner surface 102, and the turbine shroud 74 includes a radially outer surface 104. The turbine shroud mount 84 may be constructed from a metallic material, and the turbine shroud 74 may be constructed from a ceramic matrix composite.

As illustrated in FIGS. 3 and 5, the turbine shroud mount 84 defines at least one retention boss 108 extending radially inward from the radially inner surface 102. Alternately, the turbine shroud 74 may define the at least one retention boss 108 extending radially outward from the radially outer surface 102. Preferably, the at least one retention boss 108 has a rectangular cross-section. In this respect, the at least one retention boss 108 includes a radial length identified by arrow 120 and a circumferential length identified by arrow 122. In one embodiment, the radial length and circumferential length are substantially the same. Although, the radial length may be relatively longer or shorter than the circumferential length. Nevertheless, the at least one retention boss 108 may have any suitable cross-sectional shape (e.g., circular, elliptical, pentagonal, etc.). In this case, the radial length corresponds to the greatest dimension in the radial direction and the circumferential length corresponds to the greatest dimension in the circumferential direction.

Preferably, the turbine shroud mount 84 includes a plurality of retention bosses 108. As illustrated in FIG. 3, for example, the turbine shroud mount 84 may include a first retention boss 108a, a second retention boss 108b, a third retention boss 108c, and a fourth retention boss 108d. Although, the turbine shroud mount 84 may include more or less retention bosses 108 as needed or desired. Each of the plurality of retention bosses 108 is circumferentially spaced apart. For example, the first, second, third, and fourth retention bosses 108a, 108b, 108c, 108d are each circumferentially spaced apart 90 degrees. In this respect, the plurality of retention bosses 108 may be defined around the entirety of the turbine shroud mount 84 or simply a portion thereof (e.g., 180 degrees of the 360 degrees that the turbine shroud mount 84 may occupy in the circumferential direction). The plurality of retention bosses 108 may be evenly circumferentially spaced apart (e.g., every 90 degrees) or unevenly spaced apart. For example, in some embodiments, the plurality of retention bosses 108 may be divided into groups circumferentially spaced apart from one another (e.g., groups of three retention bosses 108 spaced apart 30 degrees, wherein each of the three retention bosses 108 in each group is spaced apart 10 degrees). Furthermore, each of the plurality of retention bosses 108 may be axially aligned. Although, one or more of the plurality of retention bosses 108 may be axially offset from the rest of the plurality of retention bosses 108. In one embodiment, for example, every other one of the plurality of retention bosses 108 may be axially offset from the retention bosses 108 adjacent thereto.

As illustrated in FIG. 3, the retention assembly 100 includes at least one retainer 106 positioned between the turbine shroud mount 84 and the turbine shroud assembly 74. More specifically, the at least one retainer 106 may extend circumferentially around the entire turbine shroud 74. In one embodiment, a single retainer 106 may extend circumferentially around substantially the entire turbine shroud 74. More preferably, however, a plurality of retainers 106 may extend circumferentially around the entire turbine shroud 74. In this respect, each of the retainers 106 may be in contact with or spaced apart from the respective adjacent retainers 106. Nevertheless, the one or more retainers 106 may extend around only a portion of the turbine shroud 74 (e.g., 180 degrees of the 360 degrees that the turbine shroud 74 occupies in the circumferential direction). The retention assembly 100 may include as many or as few retainers 106 as is necessary or desired.

FIG. 4 illustrates the retainer 106 before installation into the turbofan 10. The retainer 106 includes a base wall 110 having a first sidewall 112a and a second sidewall 112b extending outwardly from opposing ends thereof. The base wall 110 includes a circumferential length identified by arrow 126. The first and second sidewalls 112a, 112b respectively have a first radial length identified by arrow 128a and a second radial length identified by arrow 128b. Although the arrows 128a, 128b are shown as intersecting the arrow 90 identifying the radial direction in FIG. 4, the sidewalls 112a, 112b bend circumferentially inward upon assembly as discussed in greater detail below. In this respect, the sidewalls 112a, 112b will extend in the radial direction once the retention assembly 100 is assembled. The circumferential length of the base wall 110 is preferable relatively longer than the radial lengths of the sidewalls 112a, 112b. Although, the base wall 110 may be relatively shorter or the same length as the sidewalls 112a, 112b. The radial lengths of the sidewalls 112a, 112b are preferably substantially the same, but may be different as well.

In the uninstalled state, the first and second sidewalls 112a, 112b may respectively form a first obtuse angle identified by arrow 124a and a second obtuse angle 124b. Although, the sidewalls 112a, 112b may extend away from the base wall 110 at any angle. As such, the base wall 110 and the sidewalls 112a, 112b collectively define a slot 118, which receives the retention boss 108 upon installation into the turbofan 10. In this respect, the slot 118 may be radially outwardly open.

The retainer 106 further includes a first arm 114a and a second arm 114b, which respectively extend outward from the first and second sidewalls 112a, 112b. Each of the arms 114a, 114b includes a plurality of convolutions 116. In the embodiments shown in FIGS. 3-5, each of the arms 114a, 114b include four convolutions 116. But as long as the arms 114a, 114b each include two convolutions 116, the arms 114a, 114b may include as many or as few convolutions 116 as is needed or desired. Each of the convolutions 116 has a convolution depth extending from a centerline 132 of the arms 114a, 114b to the radially inner- or outer-most portion thereof. The convolution depth is identified by arrow 130. Preferably, all of the convolutions 116 have the same convolution depth, but may have different convolution depths as well.

The convolutions 116 are any change in direction of the arms 114a, 114b as the arms 114a, 114b extend outwardly from the first and second sidewalls 112a, 112b. In the embodiment illustrated in FIGS. 3-5, the convolutions 116 have a parabolic shape. Each of the arms 114a, 114b may include one or more concave convolutions 116a and one or more convex convolutions 116b. More preferably, the concave convolutions 116a and the convex convolutions 116b alternate as illustrated in FIG. 5. In this respect, the arms 114a, 114b may have a sinusoidal shape. In other embodiments, the convolutions 116 may be V-shaped (i.e., a two generally straight lengths converging to point and defining an acute angle therebetween) to give the arms 114a, 114b a saw tooth or triangular wave-like shape. Alternately, the convolutions 116 may be rectangular (i.e., a two generally parallel lengths connected at right angles by a perpendicular length) to give the arms 114a, 114b a square wave-like shape. Although, the convolutions 116 may have any suitable geometry that results in a change in direction. Furthermore, the arms 114a, 114b may also include different types of convolutions 116. For example, the arms 114a, 114b may have alternating parabolic convolutions and V-shaped convolutions.

The retainer 106 is preferably substantially longer in the axial direction (i.e., into the page in FIGS. 3-5) than in the radial direction (e.g., at least 10 times as long). In this respect, the retainer 106 is sheet-like. Although, the retainer 106 may have any suitable ratio of axial length to radial thickness. The retainer 106 may have a generally rectangular radial cross-section. Nevertheless, the retainer 106 may have any suitable cross-sectional shape (e.g., triangular, parabolic, etc.). Moreover, the retainer 106 preferably has a substantially constant radial cross-section and radial thickness, but may have a varying cross-section and/or radial thickness.

The retainer 106 is preferably integrally formed (e.g., via stamping/bending, casting, etc.). That is, the base wall 110; the sidewalls 112a, 112b; and the arms 114a, 114b are integrally connected. Although, the base wall 110; the sidewalls 112a, 112b; and the arms 114a, 114b may be separated formed (e.g., stamped, casted, etc.) and permanently joined together (e.g., via welding, etc.).

The retainer 106 is preferably constructed from a suitable nickel or cobalt alloys. Suitable nickel and cobalt alloys include Rene 41® Alloy produced by General Electric Co. of Schenectady, N.Y., USA; WASPALOY® produced by United Technologies Corporation of Hartford, Conn., USA; HASTELLOY® X produced by Haynes International of Kokomo, Ind., USA; INCONEL® alloy 718 produced by Special Metal Corporation of New Hartford, N.Y., USA; HAYNES® alloy 188 produced by Haynes International of Kokomo, Ind., USA; and HAYNES® GTD 222 alloy produced by Haynes International of Kokomo, Ind., USA.

When installed in the turbofan 10, the retainer 106 is positioned between the turbine shroud mount 84 and the turbine shroud 74. More specifically, the retention boss 108 on the turbine shroud mount 84 is positioned within the slot 118. The first and second arms 114a, 114b pivot radially outward from the position in FIG. 4 to the position in FIG. 5 during installation. That is, the first and second arms 114a, 114b pivot from their unassembled position substantially perpendicular to the base wall 110 to their assembled position substantially concentric with the turbine shroud 74 and the turbine shroud mount 84. In this respect, the first and second sidewalls 112a, 112b may pivot radially inward, thereby giving the slot 118 a generally rectangular cross-section. As such, the first and second sidewalls 112a, 112b are adjacent to and/or in contact with the retention boss 108.

The slot 118 should be sized and shaped to accommodate the retention boss 108. Specifically, the circumferential length of the slot 118 should be greater than the circumferential length of the retention boss 108 to permit the retention boss 108 to fit within the slot 118. The cross-sectional shapes of the slot 118 and the retention boss 108 should be generally the same. In some embodiments, the radial length of the first and second sidewalls 112a, 112b may be relatively less than the radial length of the retention boss 108. As such, base wall 110 may be in contact with the retention boss 108.

At least one of the convolutions 116 on each of the arms 114a, 114b contacts the radially outer surface 104 of the turbine shroud 74. Preferably, however, all of the convolutions 116 radially inward from the centerline 132 contact the radially outer surface 104. Although, as long as at least one convolution 116 contacts the radially outer surface 104, any number of the convolutions 116 radially inward from the centerline 132 may contact the radially outer surface 104. Upon assembly, the base wall 110 is positioned radially between adjacent convolutions 116 as illustrated in FIG. 5.

Preferably, the convolutions 116 on the arms 114a, 114b do not contact the radially inner surface 102 of the turbine shroud mount 84 and the radially outer surface 104 of the turbine shroud 74. In this respect, the convolutions 116 may be radially spaced apart from the radially inner 102. As such, the retainer 106 permits radial movement between the turbine shroud 74 and the turbine shroud mount 84. In this respect, the retainer 106 is compliant in the radial direction to allow thermal displacement between the turbine shroud 74 and the turbine shroud mount 84.

Furthermore, the retainer 106 also radially centers the turbine shroud 74 circumferentially within the turbine shroud mount 84. That is, the opposing radially forces align the turbine shroud 74 in the center of an opening defined by the turbine shroud mount 84. In this respect, the retainer 106 will re-align the turbine shroud 74 within the turbine shroud mount 84 if the turbine shroud 84 moves out of center due to, e.g., turbulence or other disturbances that jar the turbofan 10 during operation.

The retainer 106 also substantially prevents circumferential movement between the turbine shroud 74 and the turbine shroud mount 84. As discussed in greater detail above, the retention boss 108 is positioned in the slot 118. In this respect, the sidewalls 112a, 112b are positioned on either side of the retention boss 108 in the circumferential direction. The first and second arms 114a, 114b preferably exert enough radial inward force on the radially outer surface 104 to prevent sliding therebetween. In this respect, the retainer 106 substantially prevents circumferential movement between the turbine shroud 74 and turbine shroud mount 84 because the sidewalls 112a, 112b prevent the retention boss 108 for moving circumferentially relative to the turbine shroud 74. That is, at least some of the convolutions 116 substantially prevent relative circumferential movement between the turbine shroud 74 and the first and second arms 114a, 114b, and the sidewalls 112a, 112b substantially prevent relative circumferential movement between the turbine shroud mount 84 and the first and second arms 114a, 114b. The retainer 106 also helps position the turbine shroud 74 axially relative to the turbine shroud mount 84.

As discussed above, the retention assembly 100 at least radially and circumferentially positions and retains a stationary gas turbine wall, such as the turbine shroud 74, relative to an adjacent stationary gas turbine wall, such as the turbine shroud mount 84. Furthermore, the retention assembly 100 may, in at least some embodiments, use only the retainer 106, which may be integrally formed, to do so. In this respect, the retention system 100 provides a reduced part count compared to conventional gas turbine retention systems. As such, the retention assembly 100 reduces assembly time and cost.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A retention assembly for a stationary gas turbine component, comprising:
   a first stationary gas turbine wall comprising a first surface and a retention boss extending outwardly from the first surface;
   a second stationary gas turbine wall comprising a second surface; and
   a retainer positioned between the first surface and the second surface, the retainer comprising: a base wall positioned adjacent to the retention boss of the first stationary gas turbine wall;
   a first sidewall extending outwardly from the base wall;
   a second sidewall extending outwardly from the base wall;
   a first arm extending outwardly from the first sidewall; and
   a second arm extending outward from the second sidewall, wherein each of the first arm and the second arm comprises a plurality of convolutions, and wherein at least one of the plurality of convolutions is in contact with the second surface;
   wherein each of the first sidewall and the second sidewall contacts the retention boss;
   wherein the first stationary gas turbine wall is a turbine shroud mount and the second stationary gas turbine wall is a turbine shroud, wherein the retainer is radially inward of the first stationary gas turbine wall, and wherein the second gas turbine wall is radially inward of the retainer;
   wherein the plurality of convolutions comprises a first convolution and a second convolution, and wherein the base wall is positioned radially between the first convolution and the second convolution.

2. The retention assembly of claim 1, wherein the retention boss comprises a plurality of axially aligned and circumferentially spaced apart retention bosses and the retainer comprises a plurality of axially aligned and circumferentially spaced apart retainers.

3. The retention assembly of claim 1, wherein the base wall, the first sidewall, and the second sidewall collectively define a slot that receives the retention boss to substantially prevent circumferential movement between the first stationary gas turbine wall and the second stationary gas turbine wall,
   wherein the base wall comprises a circumferential length,
   wherein the first sidewall comprises a first radial length,
   wherein the second sidewall comprises a second radial length, and
   wherein the circumferential length of the base wall is longer than each of the first and second radial lengths.

4. The retention assembly of claim 3, wherein the retention boss extends radially inward from the first stationary gas turbine wall and the slot opens radially outward,
   wherein the retention boss comprises a radial length, and
   wherein the radial length of the retention boss is greater than each of the radial length of the first sidewall and the radial length of the second sidewall.

5. The retention assembly of claim 1, wherein more than one of the plurality of convolutions is in contact with the second surface, and
   wherein the retention boss has a rectangular cross section.

6. The retention assembly of claim 1, wherein each of the plurality of convolutions is radially spaced apart from the first surface.

7. The retention assembly of claim 1, wherein the plurality of convolutions comprises a plurality of alternating concave and convex convolutions.

8. The retention assembly of claim 1, wherein the first arm and the second arm extend substantially perpendicular to the base wall when the retention assembly is unassembled.

9. A gas turbine, comprising:
   a compressor;
   a combustion section;
   a turbine section comprising:
   a first stationary wall comprising a first surface and a retention boss extending outwardly from the first surface; and
   a second stationary wall comprising a second surface; and
   a retainer positioned between the first surface and the second surface, the retainer comprising:
   a base wall;
   a first sidewall extending outwardly from the base wall;
   a second sidewall extending outwardly from the base wall;

a first arm extending outwardly from the first sidewall; and a second arm extending outwardly from the second sidewall, wherein each of the first arm and the second arm comprises a plurality of convolutions, and wherein at least one of the plurality of convolutions is in contact with the second surface, and wherein each of the first sidewall and the second sidewall contacts the retention boss;

wherein the first stationary wall is a turbine shroud mount and the second stationary wall is a turbine shroud, wherein the retainer is radially inward of the first stationary wall, and wherein the second stationary wall is radially inward of the retainer;

wherein the plurality of convolutions comprises a first convolution and a second convolution, and wherein the base wall is positioned radially between the first convolution and the second convolution.

10. The gas turbine of claim 9, wherein the second surface comprises a radially outer wall of the turbine shroud.

11. The gas turbine of claim 10, wherein the retention boss comprises a plurality of axially aligned and circumferentially spaced apart retention bosses and the retainer comprises a plurality of axially aligned and circumferentially spaced apart retainers, the plurality of axially aligned and circumferentially spaced apart retention bosses comprising four retention bosses each spaced apart 90 degrees.

12. The gas turbine of claim 9, wherein the base wall, the first sidewall, and the second sidewall collectively define a slot that receives the retention boss to substantially prevent circumferential movement between the first stationary wall and the second stationary wall, and wherein the plurality of axially aligned and circumferentially spaced apart retainers collectively extend 360 degrees around a radially outer wall of the turbine shroud.

13. The gas turbine of claim 12, wherein the retention boss extends radially inward from the first stationary wall and the slot opens radially outward, and wherein the base wall contacts the retention boss.

14. The gas turbine of claim 9, wherein more than one of the plurality of convolutions is in contact with the second surface, and wherein the retainer is longer in an axial direction than in a radial direction.

15. The gas turbine of claim 9, wherein each of the plurality of convolutions is radially spaced apart from the first surface, and wherein the first surface comprises a radially inner wall of a turbine shroud mount.

16. The gas turbine of claim 9, wherein the plurality of convolutions comprises a plurality of alternating concave and convex convolutions, and wherein the base wall is positioned radially between the alternating concave and convex convolutions.

17. The gas turbine of claim 9, wherein the first arm and the second arm extend substantially perpendicular to the base wall when the retention assembly is unassembled.

* * * * *